United States Patent
Palau et al.

(10) Patent No.: US 10,949,059 B2
(45) Date of Patent: Mar. 16, 2021

(54) CONTROLLING MOVEMENT OF AN ENTITY DISPLAYED ON A USER INTERFACE

(71) Applicant: KING.COM LIMITED, St. Julians (MT)

(72) Inventors: Xavier Palau, Barcelona (ES); Pere Balsach, Barcelona (ES); Damia Vazquez, Barcelona (ES); Kamil Fazil, Barcelona (ES)

(73) Assignee: KING.COM LTD., St. Julians (MT)

( * ) Notice: Subject to any disclaimer, the term of this patent is extended or adjusted under 35 U.S.C. 154(b) by 504 days.

(21) Appl. No.: 15/161,739

(22) Filed: May 23, 2016

(65) Prior Publication Data
US 2017/0336905 A1    Nov. 23, 2017

(51) Int. Cl.
    *G06F 3/0481*    (2013.01)
    *G06F 3/0488*    (2013.01)
(52) U.S. Cl.
    CPC ........ *G06F 3/04817* (2013.01); *G06F 3/0488* (2013.01); *G06F 3/04812* (2013.01)
(58) Field of Classification Search
    CPC .... A63F 13/40; G06F 3/04817; G06F 3/0488; G06F 3/04812
    See application file for complete search history.

(56) References Cited

U.S. PATENT DOCUMENTS

| | | | |
|---|---|---|---|
| 9,772,743 B1 * | 9/2017 | Mueller | ............. G06F 3/04812 |
| 2007/0046647 A1 | 3/2007 | Ohta et al. | |
| 2013/0063380 A1 | 3/2013 | Wang et al. | |
| 2014/0007019 A1 | 1/2014 | Saukko et al. | |
| 2014/0038717 A1 | 2/2014 | Lee et al. | |
| 2014/0221088 A1 | 8/2014 | Perez et al. | |
| 2015/0089366 A1 * | 3/2015 | Beckett | ................ G06F 3/0484 715/716 |
| 2015/0094127 A1 | 4/2015 | Canose et al. | |

(Continued)

FOREIGN PATENT DOCUMENTS

| | | |
|---|---|---|
| EP | 2383027 A2 | 11/2011 |
| JP | 2011053101 A  * | 3/2011 |

OTHER PUBLICATIONS

Wireframe Tool, Principles of User Interface Design, Aug. 26, 2011, Wordpress.com, https://wireframetool.wordpress.com/2011/07/26/principles-of-user-interface-design/, pp. 1-2 (Year: 2011).*

*Primary Examiner* — Daniel W Parcher
(74) *Attorney, Agent, or Firm* — Saul Ewing Arnstein & Lehr LLP (57) ABSTRACT

Disclosed is a method of controlling an entity displayed on a user interface of a computer device, the method implemented by computer readable code executed by a processor of the computer device, the method comprising: detecting a user input at a first location on the user interface; detecting that the user input continues along a user input trace to a second location; determining a distance along a direct path between the first and second locations; calculating a speed of movement of the entity based on the determined distance; and generating for display a number of graphical indicators to be displayed on the user interface at locations spaced from one another between the first and second locations, wherein the number of displayed indicators represent the speed of movement of the entity.

26 Claims, 11 Drawing Sheets

(56) References Cited

U.S. PATENT DOCUMENTS

2015/0258430 A1* 9/2015 Alexeev .................. A63F 13/10
                                                    463/36
2017/0291110 A1* 10/2017 Ueno .................... A63F 13/426

* cited by examiner

CONTROLLING MOVEMENT OF AN ENTITY DISPLAYED ON A USER INTERFACE

TECHNICAL FIELD OF THE INVENTION

This disclosure relates to controlling an entity displayed on a user interface, particularly but not exclusively to a user interface of a touch screen device, for example in the context of a computer implemented game.

BACKGROUND OF THE INVENTION

There exist many types of computer device where the display is controlled by an input. The input may be a cursor or pointer that is controlled by a human interface device such as a mouse, joystick, keyboard etc. Increasingly, the display may comprise a touchscreen which can be controlled by a user's touch. That is, activation of functions or objects are responsive to user input made by way of the user touching the screen.

Touch screens may be provided on smaller devices such a smart phones. Interaction with objects displayed on such touch screens can be difficult in that the size of a user's finger is relatively large with respect to the area of the screen where for example an object is displayed. This may lead to a lack of precision when for example playing a computer implemented game on a smart phone.

A computer implemented game is available in which an entity displayed on a user interface of a computer device is a character whose movement is controlled by a user input wherein a user engages with the interface (e.g. a finger on a touch screen). Movement by the user's input causes corresponding movement of the entity. For example the entity can be a character which is pursuing and attacking, or being pursued.

SUMMARY OF THE INVENTION

In such a game, it is desirable to provide intuitive feedback to a user such that he can control the character with a minimum of 'turning' or 'false starts' in the game.

According to an aspect of the present invention there is provided a method of controlling an entity displayed on a user interface of a computer device, the method implemented by computer readable code executed by a processor of the computer device, the method comprising: detecting a user input at a first location on the user interface; detecting that the user input continues along a user input trace to a second location; determining a distance along a direct path between the first and second locations; calculating a speed of movement of the entity based on the determined distance; and generating for display a number of graphical indicators to be displayed on the user interface at locations spaced from one another between the first and second locations, wherein the number of displayed indicators represent the speed of movement of the entity.

In one embodiment, the graphical indicators are displayed along the direct path. The direct path can be a linear trace, wherein the trace itself is not displayed on the user interface, but the graphical indicators are displayed aligned along the direct path. The graphical indicators may be directional icons which indicate the direction of movement of the entity. These directional icons can be aligned along the direct path. Alternatively, the graphical indicators may be spaced from one another between the first and second locations in a manner such that their spacing is in a direction following the direction of the direct path, but wherein the graphical indicators need not necessarily be aligned along a linear trace according to the direct path. That is, graphical indicators may be placed on either side of a linear trace corresponding to the direct path, or for example weaving generally in the direction of the direct path between the first and second locations. In one embodiment, each graphical indicator is an arrow with an arrowhead pointing in the direction of movement.

When the displayed indicators represent the direction of movement of the entity on the user interface, this allows a user to easily understand the effect of his trace on the user interface. An initial part of the user input trace may be a straight line from the first to the second location, in which case the direct path would be determined to match that straight line. The number of graphical indicators which are displayed would correspond to the distance determined between the first and second locations along the direct path, and represent the speed of movement of the entity. The method can also comprise detecting a change of direction of the user input trace and adjusting a direction of the direct path by pivoting about the first location. Thus, where a user's finger does, for example, an L shape, the path of movement of the entity on the user interface does not follow an L shape, but instead changes the direction of the direct path between the first and second locations so that there is still a straight line. The number of displayed indicators along this line represent the speed of movement of the entity and the line indicates the direction of movement of the entity.

The method can also comprise the steps of controlling the entity to move on the user interface at the calculated speed, and controlling the entity to move on the user interface in the direction indicated by the graphical indicators.

In some embodiments, the method comprises causing a commencement marker to be displayed at the first location. The commencement marker can initially indicate the direction of the user input trace. When the direction of the direct path is adjusted, the commencement marker would also be rotated such that it then indicates the direction of the adjusted direct path. The commencement marker may for example be a circle with a small arrowhead set into its circumference.

A first one of the number of graphical indicators may be displayed after a minimum distance from the first location has been attained from the user input. A last one of the number of graphical indicators can be displayed after a maximum distance from the first location has been attained by the continued user input. This has the effect that further continued user input does not result in further graphical indicators being displayed after the maximum distance has been attained.

The first location may be the displayed location of the entity, or it can be a location separate from the displayed location of the entity.

The method can comprise the step of detecting the continuous user input to increase the distance between the first and second locations and generate an increased number of graphical indicators responsive to the increased distance. The method can comprise detecting the continuous user input to reduce the distance between the first and second locations and removing from display at least one of the number of graphical indicators in response to detecting the reduced distance.

A graphical indicator may be removed from the display after retracting it towards an adjacent one of the graphical indicators. It can be made smaller and smaller in a direction towards the adjacent graphical indicator, and then fade away just before or as it touches the adjacent graphical indicator. Alternative methods are possible for removing the graphical indicators from the display as a user traces his finger back to reduce the speed (by reducing the distance between the first and second locations).

Another aspect of the present invention provides a computer device comprising: a user interface; a processor; and a memory, wherein the memory holds computer readable code which when executed by the processor implements a method of controlling an entity displayed on the user interface, the method comprising: detecting a user input at a first location on the user interface; detecting that the user input continues along a user input trace to a second location; determining a distance along a direct path between the first and second locations; calculating a speed of movement of the entity based on the determined distance; and generating for display a number of graphical indicators to be displayed on the user interface at locations spaced from one another between the first and second locations, wherein the number of displayed indicators represent the speed of movement of the entity.

A further aspect of the invention provides a non transitory computer readable media on which is stored a computer program comprising computer readable code, the code when executed by the processor implementing a method of controlling an entity displayed on a user interface of a computer device, the method comprising: detecting a user input at a first location on the user interface; detecting that the user input continues along a user input trace to a second location; determining a distance along a direct path between the first and second locations; calculating a speed of movement of the entity based on the determined distance; and generating for display a number of graphical indicators to be displayed on the user interface at locations spaced from one another between the first and second locations, wherein the number of displayed indicators represent the speed of movement of the entity.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which.

DETAILED DESCRIPTION OF THE EMBODIMENTS

In the embodiments to be described below, features which control a character on an interface are outlined which improve the experience of the user when controlling the character. A distance from a first touch point to a second contact point is determined when a user swipes a finger across a touch screen. An indication of the first touch point is visually rendered to give the user a reference point. Additionally a direction as given by a straight line (direct path) passing through the first and the second points is determined, sometimes for as long as the finger remains in contact with the touch screen. Dependent on the determined distance a number (e.g. 4) of graphical indicators are rendered and repositioned to indicate how far from the first touch point the finger has been swiped. The graphical indicators are rendered in-between the first touch point and the second contact point, along the determined direction. In some scenarios a first indicator is not rendered until a predetermined distance is attained from the first touch point. Each graphical indicator may be associated with a maximum distance from the first touch point at which they may be rendered. The determined distance and placement and/or the number of indicators are used to convey to the user speed and direction information which corresponds to the way in which the character is controlled to move on the screen.

Figure 1:
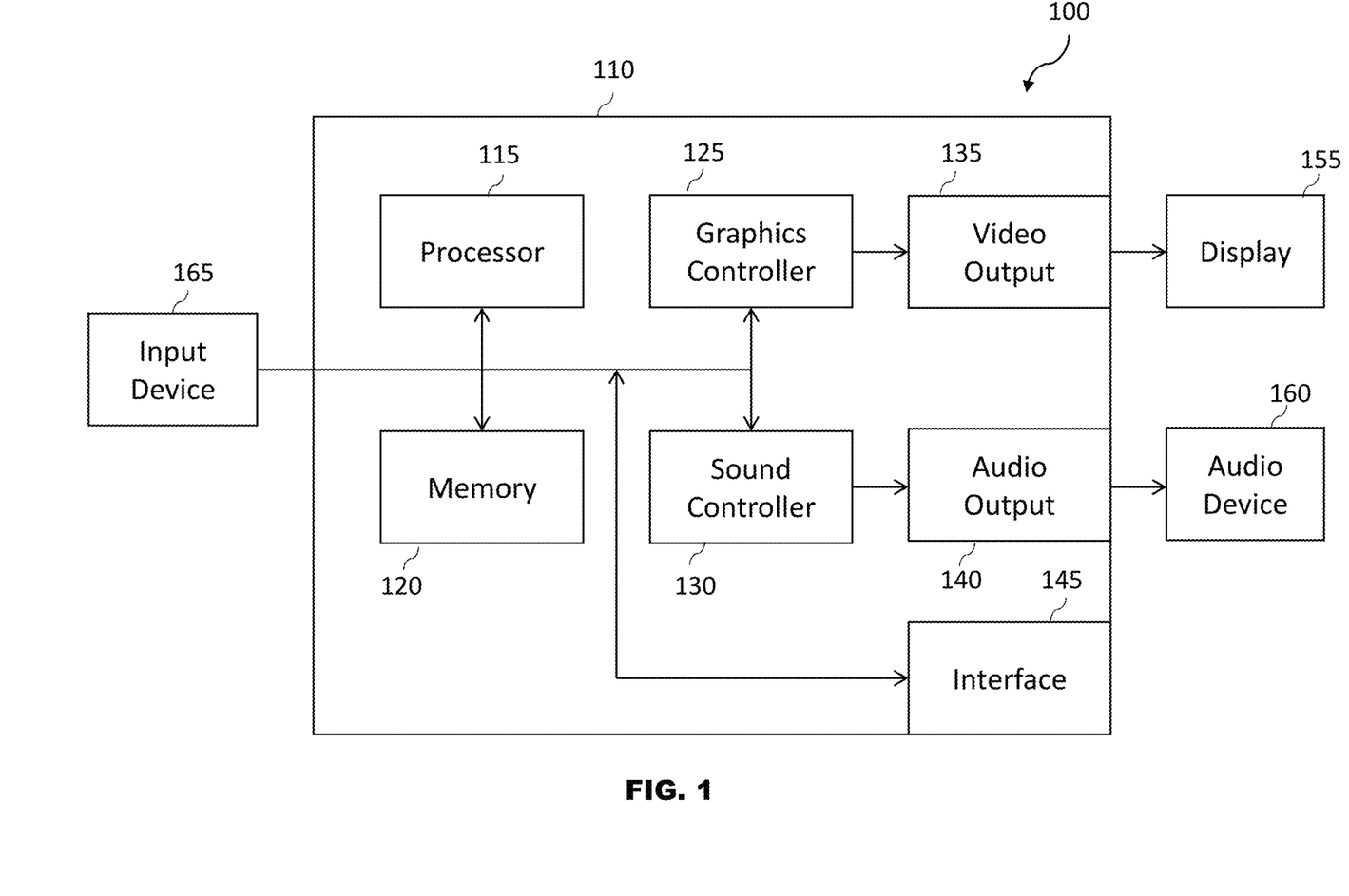
FIG. 1 shows an example device in which some embodiments may be provided.

A schematic view of a user or computing device 100 according to an embodiment is shown in FIG. 1. All of the blocks shown illustrate a function or operation which can be implemented by suitable circuitry. The blocks may be implemented in hardware and/or software. The user device may have a control part 110. The control part 110 has one or more processors 115 and one or more memories 120. The processor(s) 115 executes game code stored in the memory 120 to perform the functions described herein. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network such as the Internet or other communication infrastructure.

The video output 135 is provided to a display 155. The audio output 140 is provided to an audio device 160 such as a speaker and/or earphone(s).

The device 100 has an input device 165. The input device 165 is in the form of a touch sensitive device such as a touch screen. It should be appreciated that the display 155 may in some embodiments also provide the input device 165 by way of an integrated touch screen for example.

The blocks of the controller 110 are configured to communicate with each other via an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
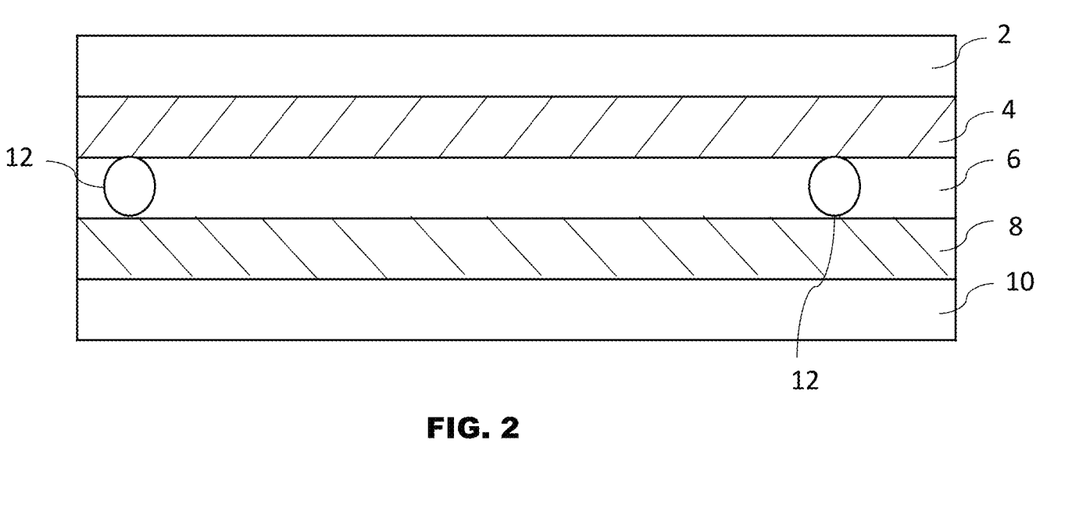
FIG. 2 shows a cross section of part of a touch screen display.

Reference is made to FIG. 2 which schematically shows a touch screen. The touch screen may incorporate any suitable touch screen technology. One example of a touch screen technology is the so-called resistive touch screen technology.

The front layer or surface 2 of the touch screen is typically made of a scratch-resistant, flexible plastic or similar. A thin film or coating 4 of conductive material is provided on the underside of the front surface. The film of conductive material can be of any suitable material and may for example be Indium Tin Oxide. A gap 6 is provided. This gap may be created by suitable spacers 12. The gap may be an air gap. A second layer of material is provided. That layer may be of glass or hard plastic. The second layer 10 is also provided with a thin film or coating 8 of conductive material on the side of the second layer facing the spacing. The coating may be of any suitable material and may also be Indium Tin Oxide. Thus, the two layers 2 and 10 are kept apart by the spacers 12 which may be arranged at regular intervals. The thin conductive films or coatings are arranged to provide electrical resistance. The arrangement is such that the electrical charge runs in one direction on the one conductive coating or film and in a perpendicular direction on the other conductive coating or film.

With a resistive touch screen, when the screen is touched, the plastic deforms so that the two conductive films meet. By measuring the resistance of the two conductive films or coatings, the touch position can be accurately determined.

It should be appreciated that this is one example of a touch screen. Another technology often used for touch screens is capacitive technology. The structure of the touchscreen is similar to that described in relation to FIG. 2. However, the first layer may typically be glass, and thus not flexible. The conductive coatings may be a uniform layer, a grid or parallel stripes running at right angles to each other on the two layers. A capacitive arrangement is formed by the two conductive coatings separated by the insulating material (air). When the finger comes close to a capacitor, it changes the local electrostatic field. The touchscreen effectively is made up of a large number of tiny capacitors. The system is arranged to monitor each of these tiny capacitors to determine where the finger touches the screen. Capacitive touch screens have the advantage that it is possible to determine several discrete touch points at the same time.

It should be appreciated that embodiments may be used with any suitable touch screen technology.

Figure 3A:
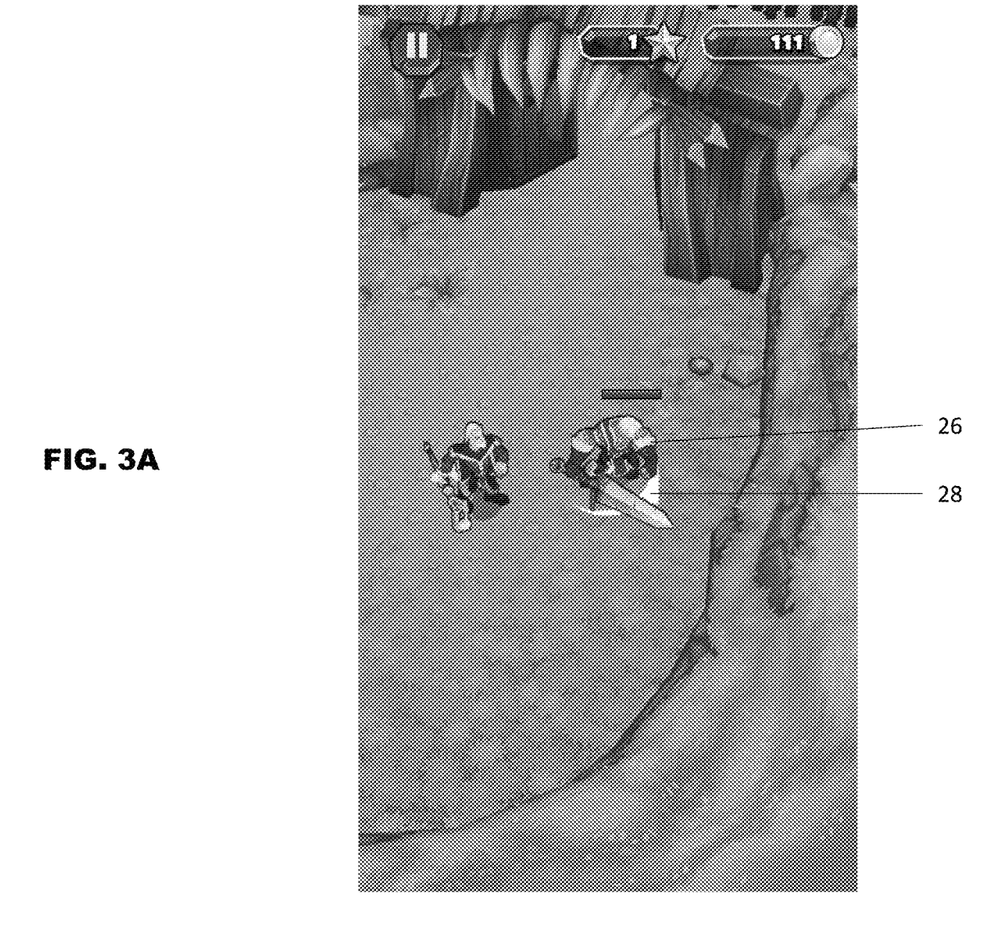
FIGS. 3A to 3E show a set of views of a touchscreen display.
Figure 3B:
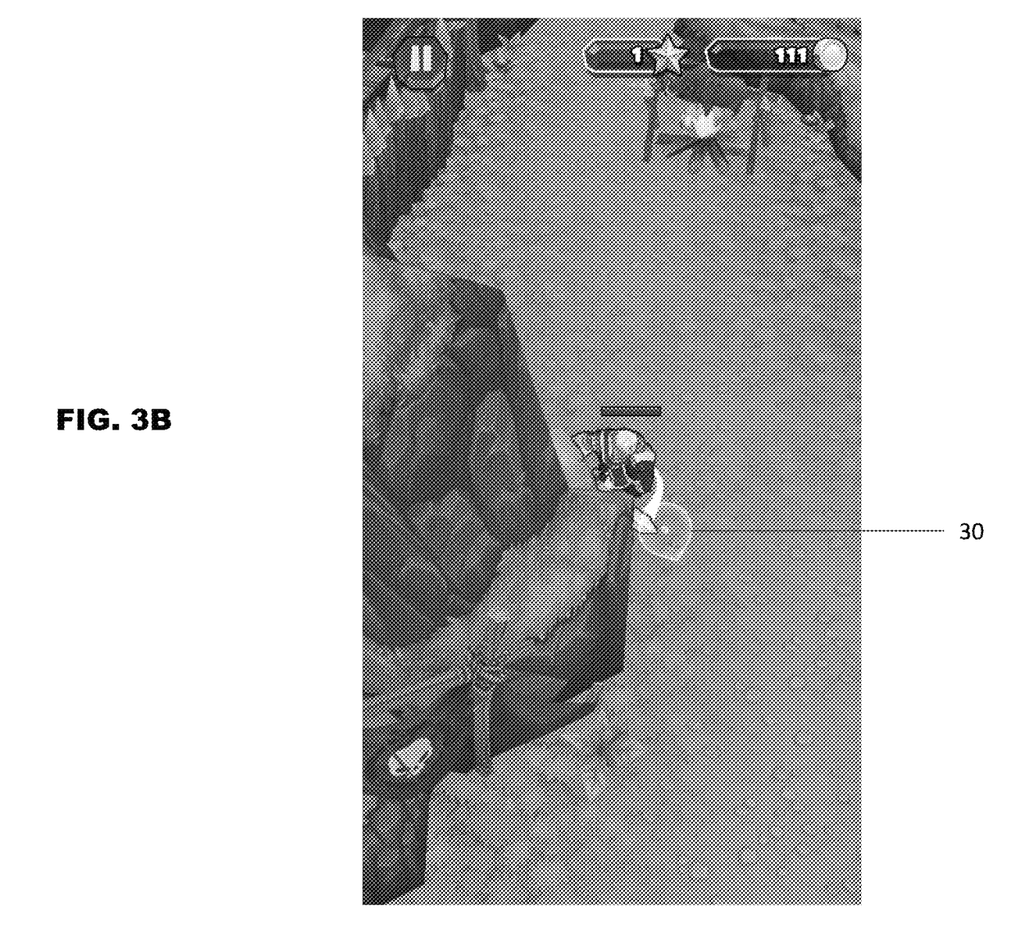
Figure 3C:
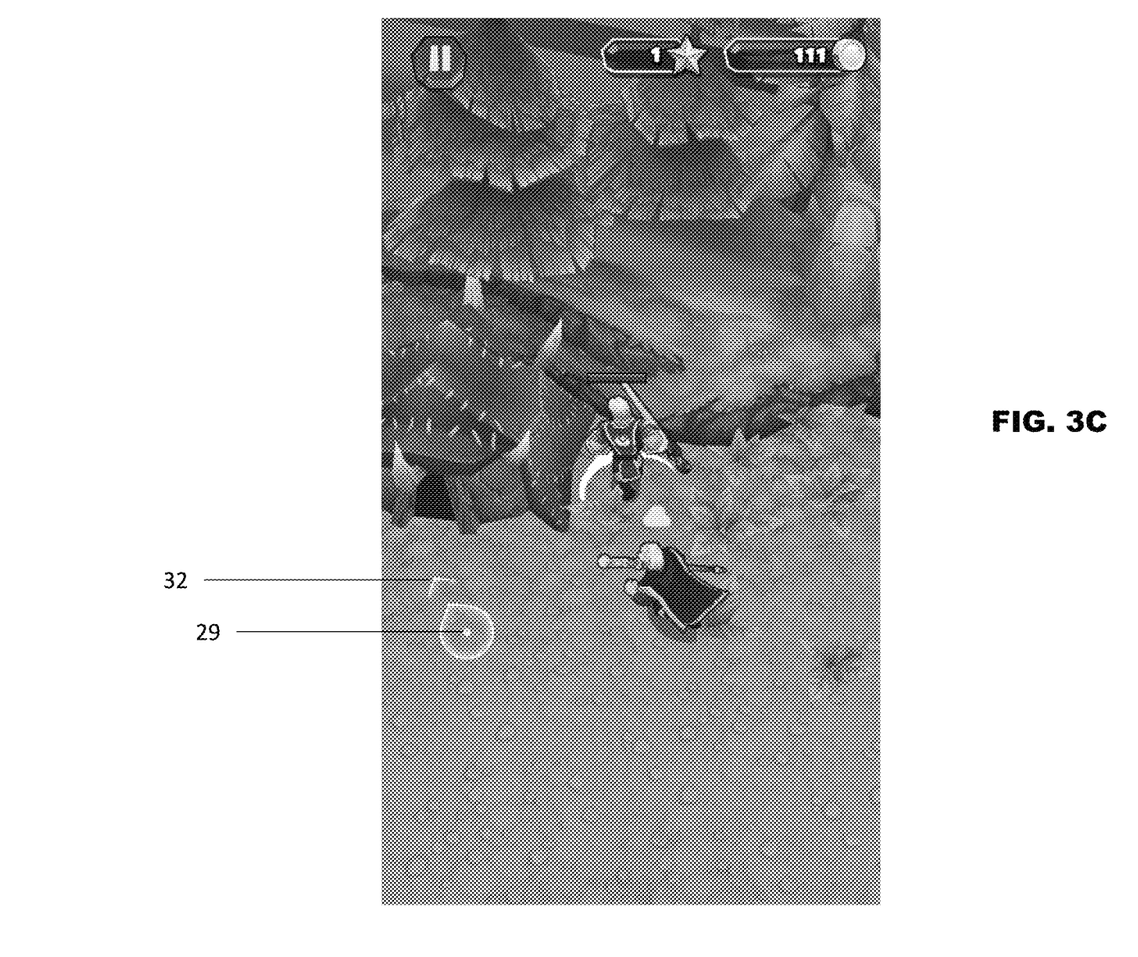
Figure 3D:
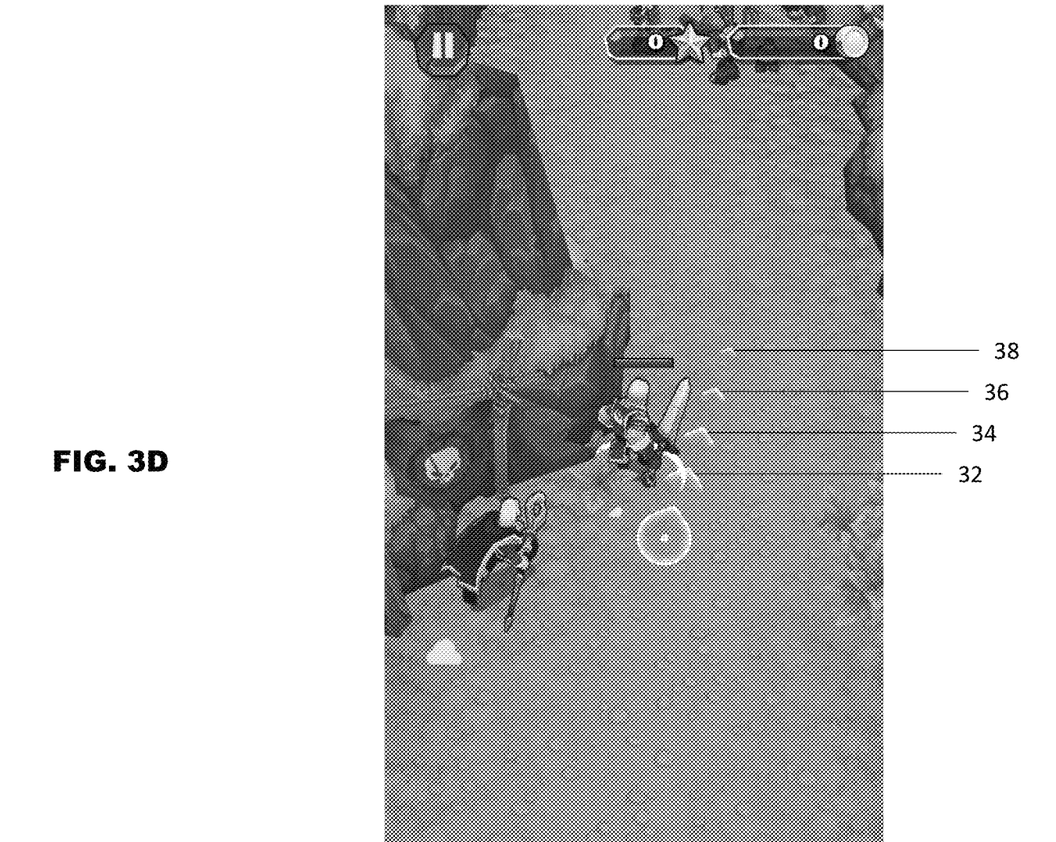
Figure 3E:
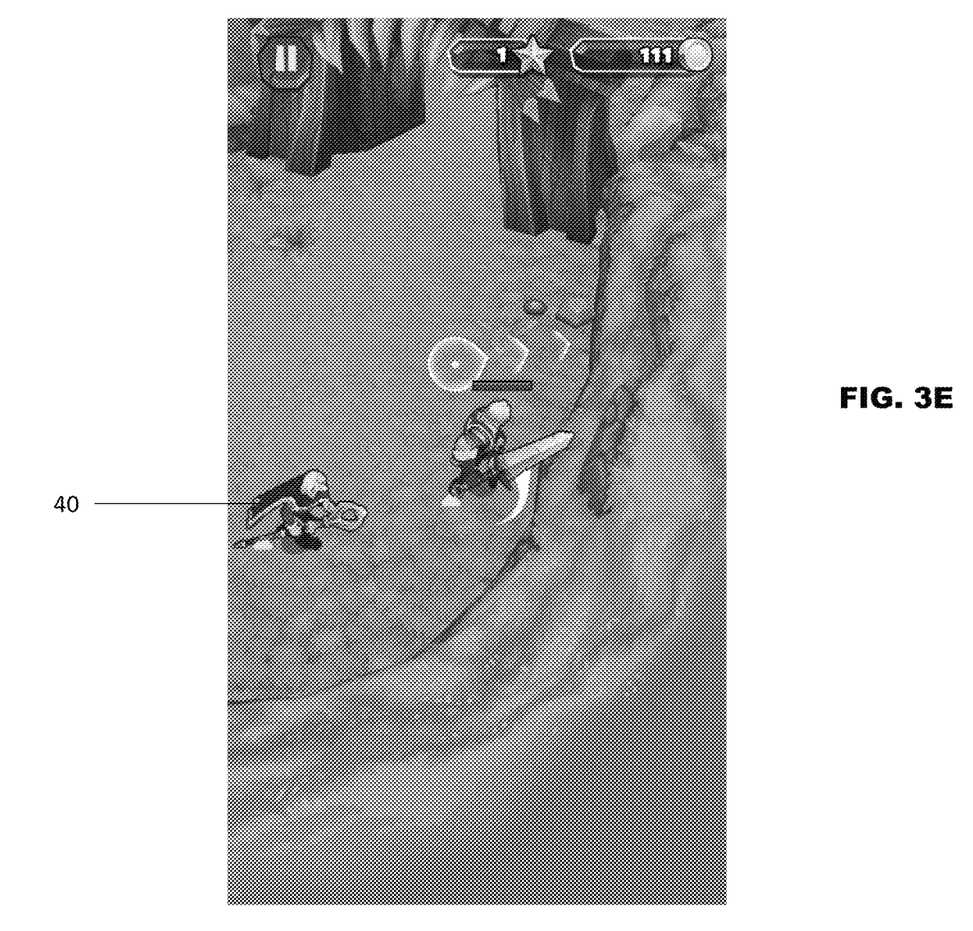

Embodiments may be particularly applicable for games which are to be played on devices which have a relatively small screen, such as smart phones and some smaller tablets. In such scenarios, a technical problem if a user has to contact a precise area on the small screen to implement an action, as the user's finger is relatively large relative to the screen. Moreover, it can be difficult for a user to understand how his engagement with the touchscreen may influence movements and actions of a character on the screen Reference is now made to FIGS. 3A to e which shows a first embodiment. Each of the arrangements shown in FIGS. 3A and 3E shows a view of a touchscreen display which is displaying a plurality of game objects. One of the game objects 26 is a user controlled entity.

In order to move the user controlled entity 26, the user will touch the touch screen at the location occupied by the user controlled entity and holding a finger against the touchscreen drag the user controlled entity to the new desired location. In some embodiments, the user controlled entity may be moved by contacting the screen at any location (which may be separate from the location of the entity 26), and without lifting the finger from the screen, moving the finger to anywhere on the screen. The user controlled entity will move in the same direction between the point first touched on the screen (first touch point) and the new "drag"-position. That is, in a direction that extends from the first touch point to the new "drag"-position along a direct path.

The move velocity of the user controlled entity is dependent on the distance between these points up to a maximum velocity.

The user controlled entity continues to move until the user releases their finger from the screen.

As shown in FIG. 3A, the user is able to control a character 26 on the game area shown on the display. The user places their finger anywhere on the screen (e.g. touch point 29 in FIG. 3C) to 'activate' the character for some motion. Note that each character is associated with a crescent shaped marker 28 underneath the character 26 pointed in the direction the character is currently facing. Note that the user can touch the screen where the character is, or at another location spaced from the character. When the user lifts his finger from the screen, the character stops. Thus the control of the character is directly responsive to the user's engagement with the screen.

The described embodiments have user friendly character control features exemplified by graphical indicators as described in the following. As soon as it is determined that a user wants to move the character 26 the character 26 turns to "face" the direction of intended movement and starts to move at the speed and in the direction as determined by the distance in between, and the direction indicated by, the initial touch point 29 and the current position of the finger/contact point; and the first indicator 32 is shown, as shown for example in FIG. 3C. At a predetermined distance the second indicator 34 becomes visible and at a third and fourth distance from the initial contact point third and fourth indicators 36, 38 are displayed respectively: see FIG. 3D for example. Each subsequent indicator is displayed at any one time in an animation which shows the indicator developing from the point at where the previous indicator was displayed, or conversely retracting towards the initial point of contact with respective increase and decrease of the distance from the initial touchpoint to the current point of contact.

To achieve the above features, the user drags their finger along the screen creating a user input trace in the direction in which they wish the character to move. Note that this trace is detected by the circuitry of the touch screen, but is not made visible to a player. If the user only drags their finger a short distance, a small white circle 30 with a point (small arrowhead) in the direction of the drag appears (see FIG. 3B). This is a first graphical marker in the form of a directional icon—it indicates a direction of movement intended by the user. Once they have dragged their finger beyond a minimum distance from the initial touch point, the first graphical indicator in the form of an arrow 32 appears. Note that the minimum distance is along a first part of the user input trace, for as long as the user input trace is a straight line. However, if the user has changed direction in the meantime, a linear trace is calculated by the processor (as explained later) to determine a direct path between the first touch point and the new contact point, and the distance along that linear trace is used to determine the minimum distance. As the user continues to drag his finger, the second, third and fourth arrows consecutively appear, pointing in the direction the user dragged their finger in (or of the calculated linear trace). The number of arrows which appear depends upon the distance of the drag, up to a maximum of four arrows once a maximum distance is reached—the user has only dragged their finger a small distance in FIG. 3C so one arrow 32 has appeared, but the user has dragged up to or beyond the maximum distance in FIG. 3D causing four arrows to appear, 32, 34, 36, 38. The graphical markers described above are represented by arrowheads in FIGS. 3A-3E, but are not limited to this shape. For example, the graphical indicators could instead take the shape of footsteps, dots or crosses. They may also not be limited to a maximum of four graphical indicators once the maximum distance of drag has been reached. If the user changes the direction of the drag, the direction of the point on the crescent and the point on the circle move to follow, and the arrows move linearly, effectively as if user's first touch point on the screen is a pivot point for a straight line and the point at which finger is currently at is the tip of the line. It is possible to consider the direction and speed as an arrow (radial vector) extending outwards from a center of a circle (being the first touch point) to the radius of the circle (the second contact point). At each of certain radii from the centre the indicators are respectively rendered on the screen in a stepwise manner and once rendered, they are extended along the radial vector in a linear manner based on the determined distance of the finger from the initial point of contact.

The indicators do not have to appear in a straight line arrangement in the direction of the character's travel. For example, they could appear like a pair of footprints, each foot appearing alternately, or in a pattern such as a wave, wherein the indicators are displaced at varying distances from either side of the arrow (radial vector) to give a wave pattern which 'grows/shrinks' in the direction of the arrow (radial vector).

As explained above, the aim of the user input is to control the movement of the character on the display. The direction of the arrows 32,34,36,38 (or as many of these as are present) determines the direction of motion of the character 26, and the number of arrows determines the speed at which the character travels. To increase the speed, the user drags further from the first point of contact, causing more arrows to appear until the maximum number of arrows is reached. See FIG. 4A, where intermediate renderings between, for example, indicators 32 and 34 are shown as 32a, 34a. The finger swipe is shown at 40, in successive distances. To reduce the speed the user drags the finger back closer to the first point of contact, reducing the number of arrows until the minimum distance is reached. See FIG. 4B, where intermediate renderings between the fourth and third indicators 38, 36 are labelled 38b, 36b. When the user drags his finger to reduce the distance between the locations to reduce the speed, the arrows disappear smoothly. The outermost arrow retracts into (shrinks into) the one behind it until it disappears, keeping on going until the user stops dragging or until the minimum distance is attained. In some embodiments the outermost arrow fades away before it reaches the adjacent arrow.

Figure 4A:
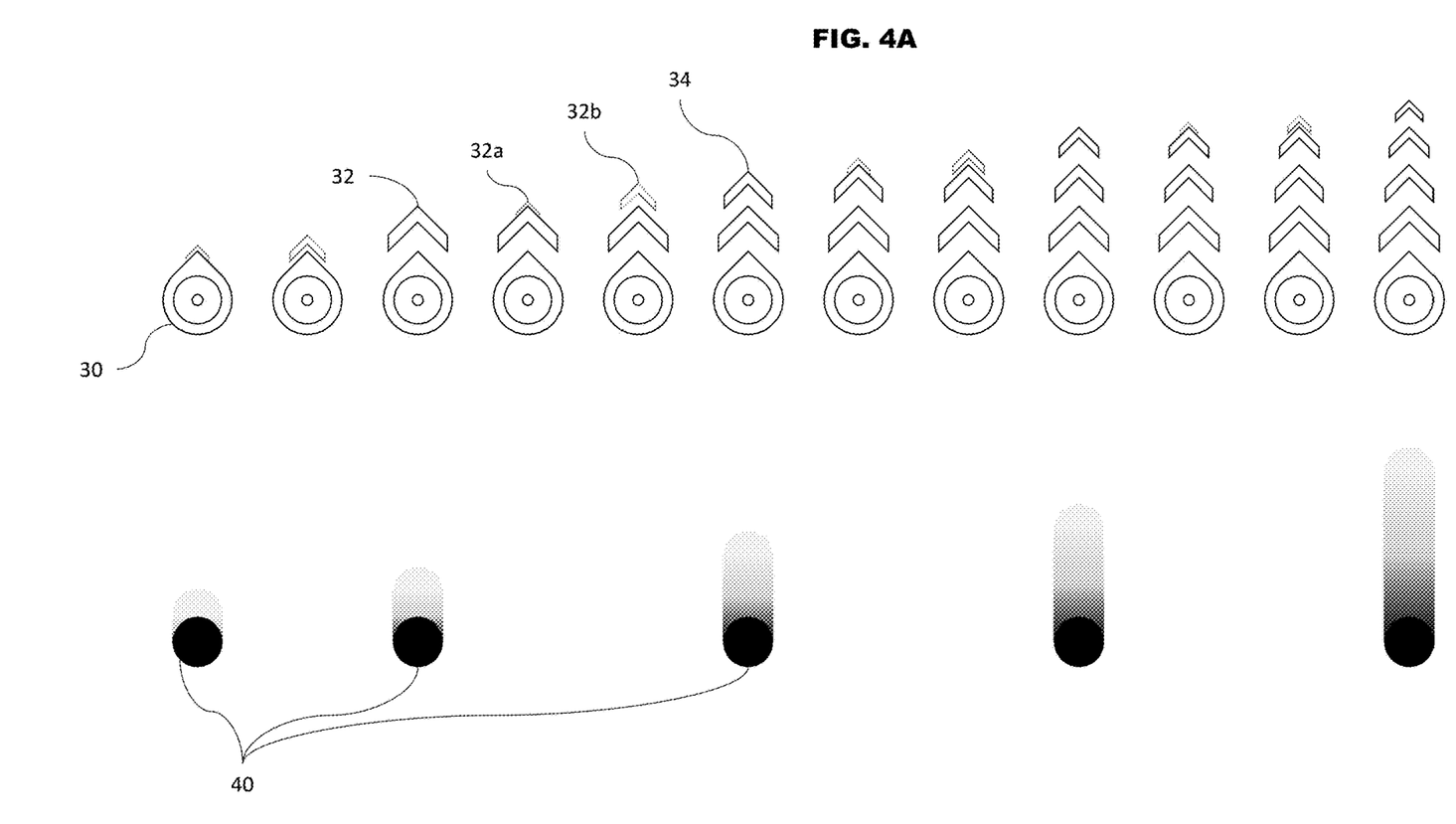
FIG. 4A to 4C show the expansion and retraction of graphical indicators.
Figure 4B:
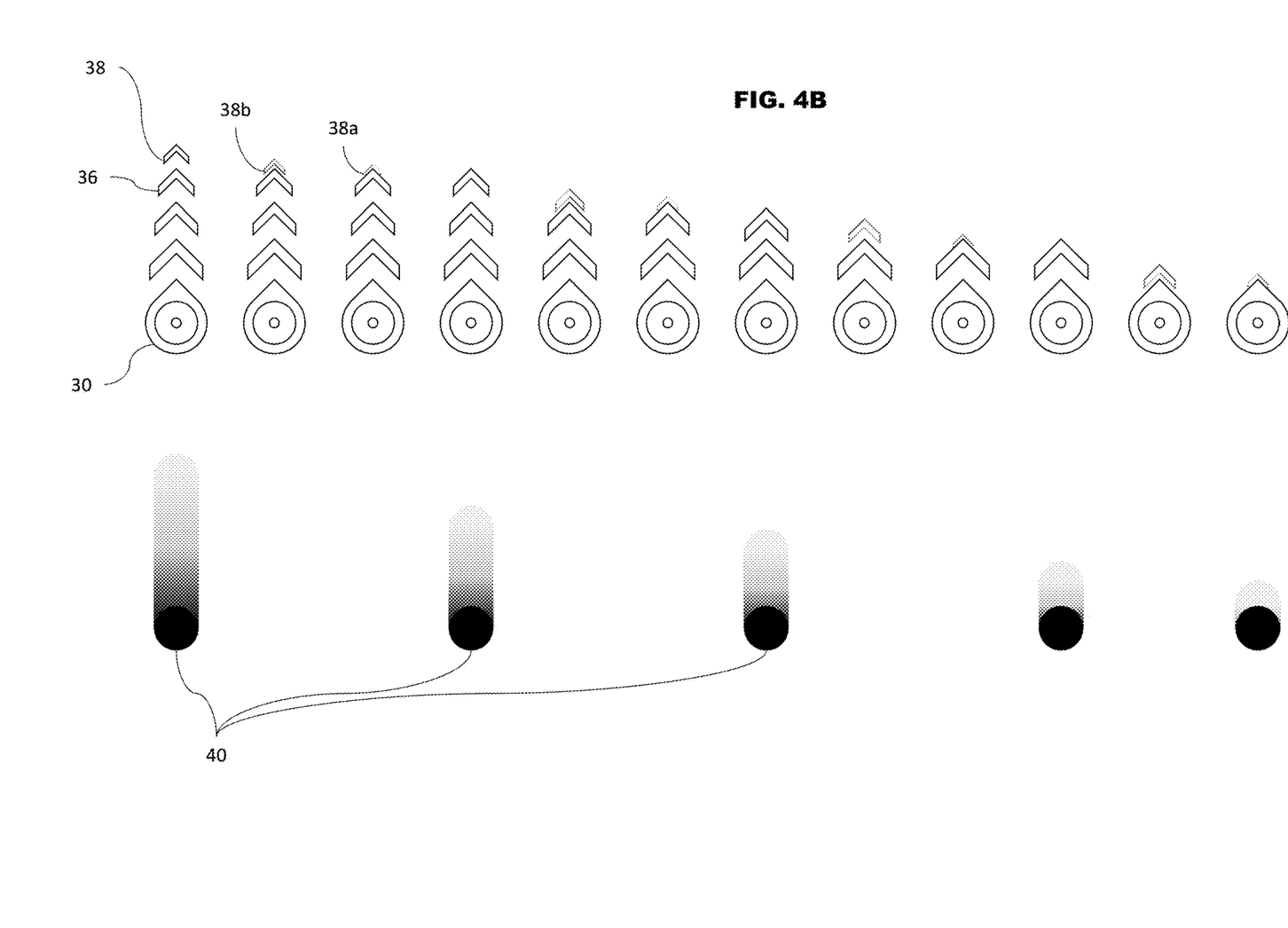
Figure 4C:
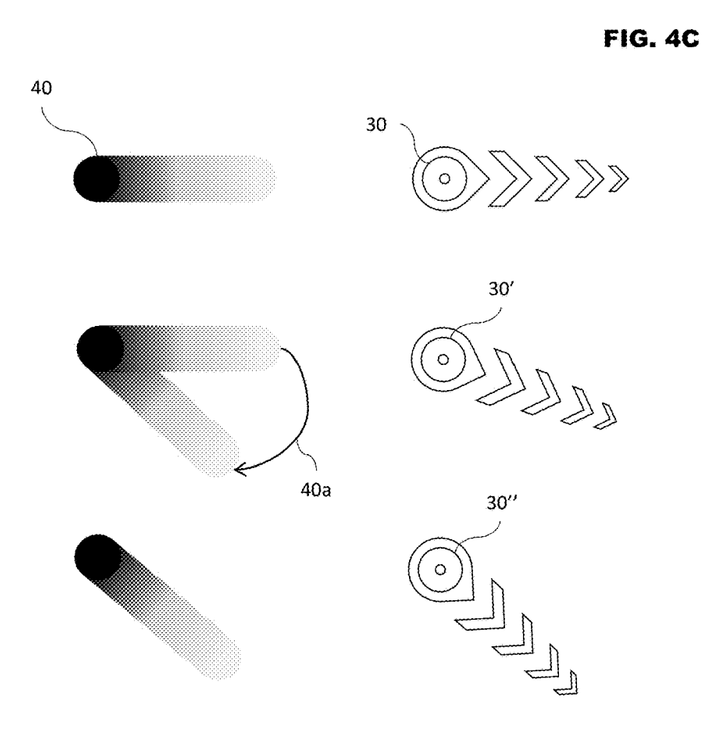

The arrows retracting into/growing out from the one behind, shown in FIGS. 4A-4C, is one example of a multitude of possible animations to show changes in the character's move velocity. The outermost graphical indicator could fade in/out, or slide behind/out of the previous indicator, or both. The animation could also match the type of indicator used. For example, in the case of footprint indicators, the indicators could appear as if footsteps were imprinting onto/growing out of the ground.

If there is an obstruction in the way of the user, the animation of the arrows is exactly the same, but the character will not be able to move past the obstruction until the direction is changed. See FIG. 3E.

The red bar above the character indicates their strength or health, which fluctuates depending on their performance in the game, against other characters and other game elements.

When the user removes their finger the character's movement stops and the indicators 32,34,36,38 are retracted and fade away (similarly to as shown in FIG. 4B).

To re-engage the character 26, a new finger touch starts the process over. A new initial point of contact is indicated and speed and direction are determined in relation to the new touch point. When moving back and forth along the indicators the speed will increase and decrease depending on the direction in relation to the initial point of contact.

When character is moving (i.e. a user's finger is in touch with screen to control the character 26) the user can control the speed by moving his finger in any direction away from the touch point. So even if the user drags his finger in another direction, the speed of the character is still increased and decreased dependent on the distance to the initial touch point. Thus it is not necessary that the finger only moves back and forth along the indicators. It can move to anywhere on the screen and as long as the distance between current and initial touch point increases (increase speed) or decreases (decrease speed), the speed will be modified. FIG. 4C shows the effects on the graphical indicators when a user changes the direction of his finger swipe, e.g. 40a causes the line of the indicator to move from position 30 through position 30' to position 30", showing that the graphical indicators are repositioned along the new direct path.

In some embodiments a small "dead zone" area (of a few pixels) around the initial touch position can be implemented, to avoid detecting unintended slight initial movements of the player's finger. A decision as to whether or not a user intends to move the character, and has not just inadvertently moved his finger, is determined/approximated by detecting a minimum distance between the initial touch point and second contact point, before a move is considered intentional and subsequently implemented. The touch point may coincide with a specific pixel. However, in other embodiments, there may not be a one to one relationship between respective touch point and a respective pixel. That touch point may be determined by an algorithm in dependence on the signal output from the touch screen, for example to define coordinates with respect to the touch screen surface. When the user's finger stops moving, new coordinates can be detected for the new contact point and these coordinates may be used to determine whether the new contact point is outside a minimum distance from the touch point.

When determining a contact point, the signal output is processed so as to define the contact point as the center point of the touch location. Defining a center of the touch location may make the determination of distance simpler.

Figure 5:
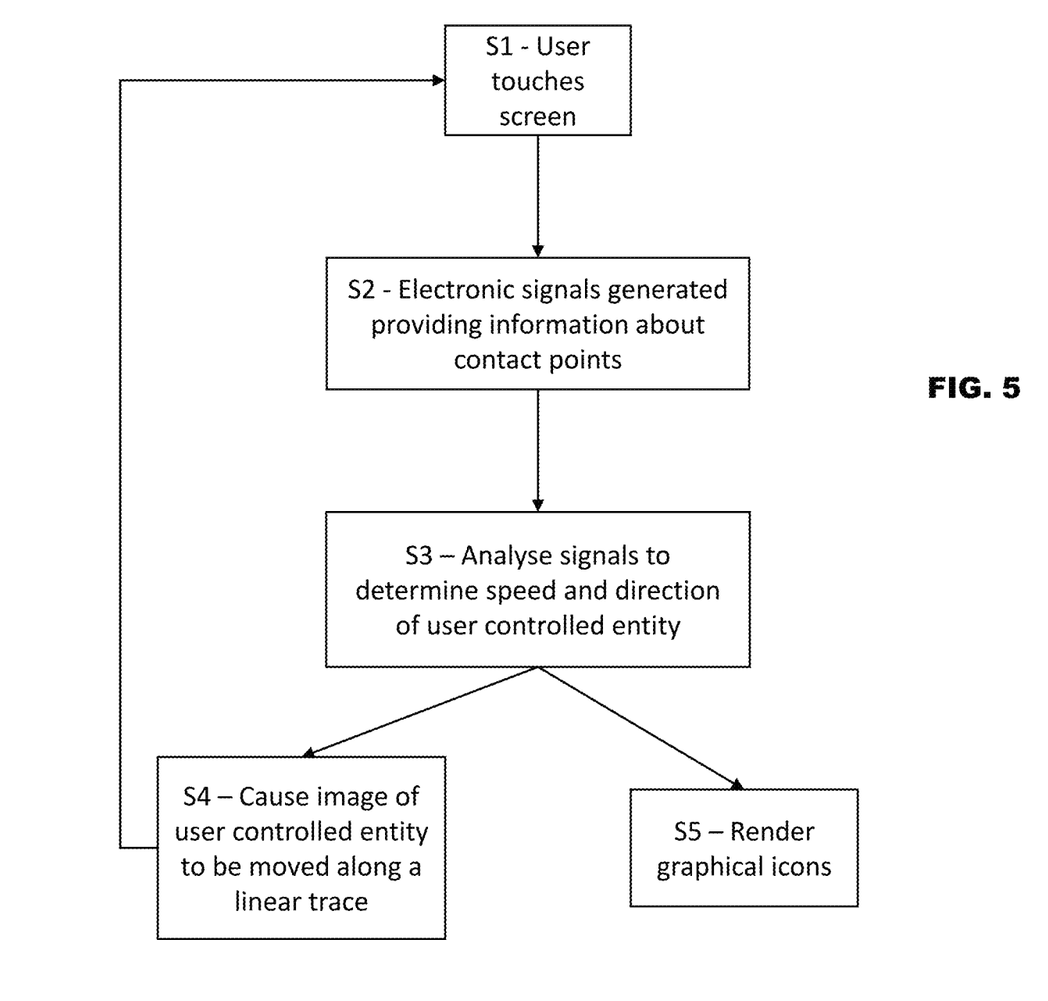
FIG. 5 shows an example flowchart according to an embodiment.

Reference is made to FIG. 5 which shows a method of an embodiment.

In step S1, the user touches the screen. As mentioned, this touch can take any suitable format and may comprise the user dragging their finger across the touchscreen in order to move the user controlled entity. It should be appreciated that the touch may be via a user's fingers or by using a stylus or the like. In some embodiments, the user will need to physically touch the touch screen in order to cause the interaction. In other embodiments, the user's interaction may need only to be in close proximity to the touchscreen in order to cause the interaction. It should be appreciated that the term "touch" is intended to cover any or all of these scenarios which result in a user input being detected by the touchscreen.

In step S2, electrical signals will be generated by the touchscreen circuitry. This is as described for example in relation to FIG. 2. The electrical signals provide information as to the location where the user has touched the touchscreen, (the user's first touch point) and latest contact point with the screen.

The electrical signals are provided in step S3 to a processing function. The processing function can be carried out by the code executed by the processers 115. The signal processing function will analyze the signals to detect the user's intention to control the movement of the user controlled entity 26.

The processing function determines the location of the user's input. The location of the user's touch on the touch screen is determined from the received electronic signals from the touch screen, as known in the art. It should be appreciated that the processing function may also use stored information as to the entity or entities being displayed on the display at the location associated with the touch input.

To move the character, the user input is received continuously over a period of time. The location of the touch on the touchscreen changes and a determination is made about how fast and in what direction the user controlled character is to be moved. In some embodiments, this may be in conjunction with determining that the initial touch location is associated with a user controlled entity. Note that the direction of movement is also determined.

In step S4, if it is determined that the user controlled entity is being moved, then the image of the user controlled entity which is displayed on the display moves along a direct path derived from (but not necessarily matching) the user's input traces as described above. Where a user controlled entity is determined to be moving, the path of the movement and/or the location of the user controlled entity may be stored in memory. In some embodiments, where a user controlled entity is determined to move, the location data of the user controlled entity may be updated in memory. In step S5, appropriate graphical icons are rendered as described earlier, corresponding to the determined distance between touch and the direction of movement of the user's touch.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A method of controlling an entity displayed on a user interface of a computer device, the method implemented by computer readable code executed by a processor of the computer device, the method comprising:
    generating for display a game area to be displayed on the user interface, said entity being controllable to move within said game area and being displayed in said game area;
    detecting a user input at a first location on the user interface in the same game area in which the entity is displayed;
    detecting that the user input continues along a user input trace to a second location in the same game area in which the entity is displayed;
    determining a first distance along a direct path between the first and second locations;
    determining a speed of movement of the entity based on the determined distance and a movement of the user input from the first location to the second location;
    generating for display in the game area a number of graphical indicators to be displayed on the user interface at locations spaced from one another between the first and second locations while the entity is moving, wherein the number of displayed graphical indicators represent the speed of movement of the entity;
    causing said entity to be moved in a direction corresponding to a direction of the direct path between the first and second locations within said game area displayed on said display as said user input is being provided, said entity being moved within said game area in dependence on said determined first distance and said determined speed;
    detecting that the user input continues along the user input trace to a third location in the same game area in which the entity is displayed while said entity is moving, said third location being located to one side of the direct path between the first and second locations;
    updating the displayed graphical indicators based on the third input location, such that the updated graphical indicators are displayed along a direct path between the first and third locations while the entity is moving, and
    detecting continuous user input to reduce the distance between the first and second locations and removing from the display at least one of the number of graphical indicators in response to detecting the reduced distance, wherein the at least one of the graphical indicators is retracted towards an adjacent one of the graphical indicators, before being removed from the display.

2. The method according to claim 1, wherein the graphical indicators are displayed along the direct path between the first location and the second location.

3. The method according to claim 2, wherein the graphical indicators are directional icons which indicate a direction of movement of the entity.

4. The method according to claim 1, comprising the step of controlling the entity to move on the user interface at the calculated speed.

5. The method according to claim 1, comprising the step of controlling the entity to move on the user interface in a direction indicated by the direct path.

6. The method according to claim 1, comprising causing a commencement marker to be displayed at the first location.

7. The method according to claim 6, wherein the commencement marker indicates a direction of the entity.

8. The method according to claim 1, comprising displaying a first one of the number of graphical indicators after a minimum distance from the first location has been attained from the user input.

9. The method according to claim 8, comprising displaying a last one of the number of graphical indicators after a maximum distance from the first location has been attained by the continued user input.

10. The method according to claim 1, wherein the first location is a location separated from the displayed location of the entity.

11. The method according to claim 1, wherein the graphical indicators are directional icons which indicate a direction of movement of the entity.

12. The method according to claim 11, wherein each graphical indicator is an arrow with an arrowhead pointing in the direction of movement.

13. The method according to claim 1, comprising detecting a change of direction of the user input trace and adjusting a direction of the direct path by pivoting about the first location.

14. The method according to claim 1, comprising detecting the continuous user input to increase the distance between the first and second locations and generating an increased number of graphical indicators responsive to the increased distance.

15. A method according to claim 14, wherein each one of the increased number of graphical indicators is displayed on the display moving away from a respective previous one of the indicators.

16. A method according to claim 14, wherein each one of the increased number of graphical indicators is displayed on the display moving away from a respective previous one of the indicators and increasing in size as it moves away from the respective one of the indicators.

17. A method according to claim 14, wherein each one of the increased number of graphical indicators is initially displayed on the display at a point at which a respective previous one of the indicators is displayed and is then moved away from the respective previous one of the indicators.

18. The method according to claim 1, wherein the step of detecting that the user input continues comprises detecting that the user input has continued outside an area around the first location, to avoid detecting unintended user input as continued user input.

19. The method according to claim 1, comprising, responsive to said updating the displayed graphical indicators, causing the movement of said entity to be updated such that the entity is moved in a direction corresponding to the direct path between the first and third locations within said game area displayed on said display.

20. A computer device comprising:
a user interface;
a processor; and
a memory, wherein the memory holds computer readable code which when executed by the processor implements a method of controlling an entity displayed on the user interface, the method comprising:
generating for display a game area to be displayed on the user interface, said entity being controllable to move within said game area and being displayed in said game area;
detecting a user input at a first location on the user interface in the same game area in which the entity is displayed;
detecting that the user input continues along a user input trace to a second location in the same game area in which the entity is displayed;
determining a first distance along a direct path between the first and second locations;
determining a speed of movement of the entity based on the determined distance and a movement of the user input from the first location to the second location;
generating for display in the game area a number of graphical indicators to be displayed on the user interface at locations spaced from one another between the first and second locations while the entity is moving, wherein the number of displayed graphical indicators represent the speed of movement of the entity;
causing said entity to be moved in a direction corresponding to a direction of the direct path between the first and second locations within said game area displayed on said display as said user input is being provided, said entity being moved within said game area in dependence on said determined first distance and said determined speed;
detecting that the user input continues along the user input trace to a third location in the same game area in which the entity is displayed while said entity is moving, said third location being located to one side of the direct path between the first and second locations;
updating the displayed graphical indicators based on the third input location, such that the updated graphical indicators are displayed along a direct path between the first and third locations while the entity is moving; and
detecting continuous user input to reduce the distance between the first and second locations and removing from the display at least one of the number of graphical indicators in response to detecting the reduced distance, wherein the at least one of the graphical indicators is retracted towards an adjacent one of the graphical indicators, before being removed from the display.

21. A computer device according to claim 20, wherein the method comprises displaying a first one of the number of graphical indicators after a minimum distance from the first location has been attained from the user input.

22. A computer device according to claim 20, wherein the method comprises detecting the continuous user input to increase the distance between the first and second locations and generating an increased number of graphical indicators responsive to the increased distance.

23. A computer device according to claim 22, wherein each one of the increased number of graphical indicators is displayed on the display moving away from a respective previous one of the indicators.

24. A computer device according to claim 22, wherein each one of the increased number of graphical indicators is displayed on the display moving away from a respective previous one of the indicators and increasing in size as it moves away from the respective one of the indicators.

25. A computer device according to claim 22, wherein each one of the increased number of graphical indicators is initially displayed on the display at a point at which a respective previous one of the indicators is displayed and is then moved away from the respective previous one of the indicators.

26. A non-transitory computer readable media on which is stored a computer program comprising computer readable code, the code when executed by the processor implementing a method of controlling an entity displayed on a user interface of a computer device, the method comprising:
generating for display a game area to be displayed on the user interface, said entity being controllable to move within said game area and being displayed in said game area;
detecting a user input at a first location on the user interface in the same game area in which the entity is displayed;
detecting that the user input continues along a user input trace to a second location in the same game area in which the entity is displayed;
determining a first distance along a direct path between the first and second locations;
determining a speed of movement of the entity based on the determined distance and a movement of the user input from the first location to the second location;
generating for display a number of graphical indicators to be displayed on the user interface at locations spaced from one another between the first and second locations while the entity is moving, wherein the number of displayed graphical indicators represent the speed of movement of the entity;

causing said entity to be moved in a direction corresponding to a direction of the direct path between the first and second locations within said game area displayed on said display as said user input is being provided, said entity being moved within said game area in dependence on said determined distance and said determined speed;

detecting that the user input continues along the user input trace to a third location in the same game area in which the entity is displayed while said entity is moving, said third location being located to one side of the direct path between the first and second locations;

updating the displayed graphical indicators based on the third input location, such that the updated graphical indicators are displayed along a direct path between the first and third locations while the entity is moving; and detecting continuous user input to reduce the distance between the first and second locations and removing from the display at least one of the number of graphical indicators in response to detecting the reduced distance, wherein the at least one of the graphical indicators is retracted towards an adjacent one of the graphical indicators, before being removed from the display.

* * * * *